Feb. 15, 1955 P. M. DOLAN 2,701,930
CHECKERED HANDGRIP FOR FIREARMS
Filed Nov. 30, 1951
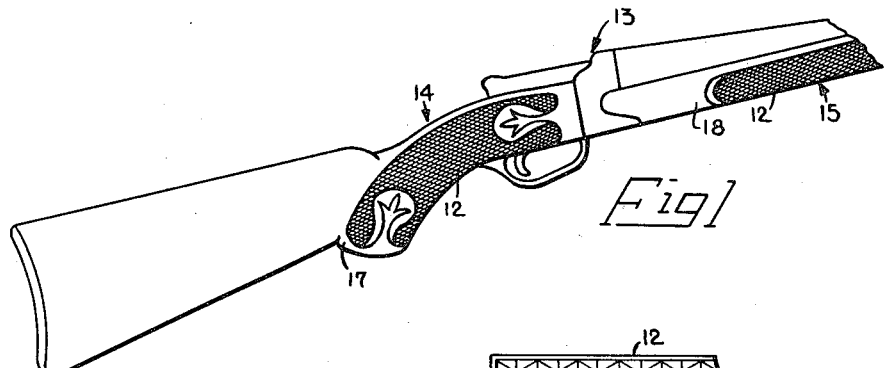
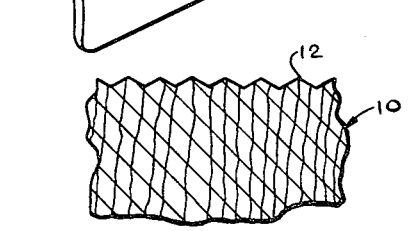
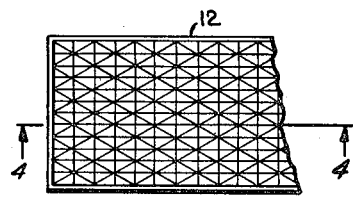
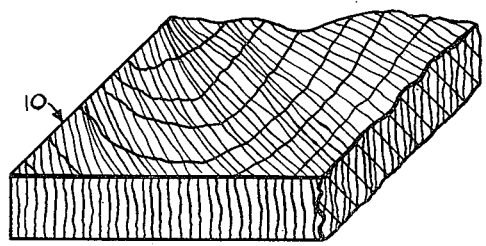
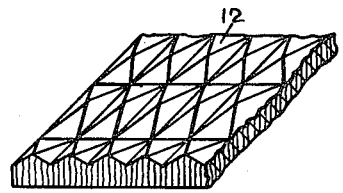
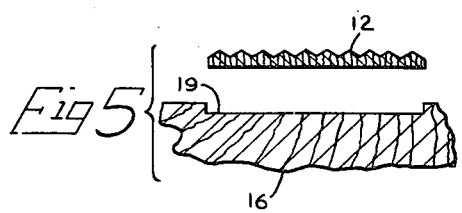
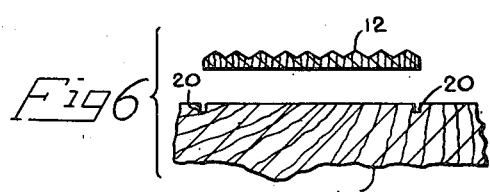
INVENTOR.
PAUL M. DOLAN
BY Austin, Dieke, Wilhelm + Padlon
ATTORNEYS

United States Patent Office 2,701,930
Patented Feb. 15, 1955

2,701,930

CHECKERED HANDGRIP FOR FIREARMS

Paul M. Dolan, Essex, Conn., assignor to Olin Mathieson Chemical Corporation, a corporation of Virginia Application November 30, 1951, Serial No. 259,201

5 Claims. (Cl. 41—24)

The invention relates to the treatment of wood material in general and more particularly to embossing or checkering the hand grip areas of a firearm and to products thereof.

It is common practice in the manufacture of firearms to roughen the surface of or to checker the hand grip portions such as the stock, the pistol grip handle, the forearm, etc., of such firearm. This is ordinarily done manually by skilled and highly paid operators. Heretofore, various efforts have been made to overcome the necessity for continuing this expensive practice. Among the methods previously suggested is the molding or preforming of the checkering in a suitable thermo-plastic or thermosetting material or resin and then attaching the molded part to the gun. This practice, however, is open to several objections, a principal objection being that the plastic does not give the proper "feel" to the gun. That is to say, the plastic checkering feels differently from the conventional checkered woodwork. Furthermore, such checkering in many instances is made of nitrocellulose which not only constitutes a hazard because of its inflammability but also after a period of exposure on the firearm becomes brittle and tends to crack, thereby imparting a shoddy appearance to the firearm.

Accordingly, a primary object of the present invention is to overcome the undesirable characteristics of these prior practices.

The present invention encompasses the treatment of the wood and hand gripping portions of the stock and other wood parts for use in firearms by initially immersing such wooden material in a suitable plastic setting medium, such as a cold setting or thermoplastic or thermosetting material, then subjecting it to the action of heat and/or pressure within suitable dies while simultaneously or alternately checkering the wooden material to any suitable design or specification.

According to the present invention, a portion of the wooden material, such as a sheet of end grain veneer or plate of natural wood, is provided and treated with a suitable material which may be thermosetting, thermoplastic resin, or a cold setting resin. The sheet or plate is then subjected to high pressure and/or heat between suitable dies, one of which impresses designs, geometric shaped or diamond-like projections of checker work into the surface of the wooden sheet. The wooden sheet is then applied to the butt or hand-gripping portions of the gun so as to simulate the present conventional manual checkering on the wooden gun parts.

With the above in view, another object of the present invention is to provide end grain checkered wood or other embossed material which can be readily used for firearms.

Still another object of the present invention is to provide a method of forming end grain checkered wood or use on and in connection with typical firearms.

Still another object of the present invention is to provide an end grain checkered resin treated wood product with or without colors for various desired uses.

Other objects and features of the present invention will become apparent from the following description taken in conjunction with the accompanying drawings in which:

Fig. 1 illustrates a plan view of parts of a typical gun having checkered portions, according to the invention;

Fig. 2 illustrates a sheet or plate of end grain veneer having its grain running in the direction of sheet thickness, that is, normal to the main surface of the sheet, prior to impregnation and pressing;

Fig. 3 illustrates the sheet of Fig. 2 after impregnation and pressing;

Fig. 4 illustrates a sectional view of the sheet taken on line 4—4 of Fig. 3;

Fig. 5 illustrates an exploded view of one method of securing the checkered sheet to the base wood of a gun;

Fig. 6 illustrates an exploded view of another method of applying the preformed or partially preformed checkered sheet for final formation to the base wood or stock of a gun; and Fig. 7 is a sectional view of a piece of wood wherein the checkering is formed directly on a treated part thereof in a single operation.

Referring now to the drawings in which similar reference characters relate to similar parts throughout, a piece or sheet of wood 10 is cut across the grain by a hand saw or by any other suitable type of saw to obtain a sheet or veneer of any desired or suitable thickness. This exposes the end grain on both flat surfaces; the grain running substantially perpendicular thereto, as shown. The sheet is then treated with a suitable moldable material, such as a thermosetting or thermoplastic material, or resin, either in dry form or in solution. Various plastics or resins which can be formed into emulsions or suspensions may also be used.

In this connection also, cold setting water-soluble materials or resins may be used. Preferred types of such cold setting resins are those known as Uracs, which are urea-formaldehyde resins, and Meluracs, powdered melamine urea-formaldehyde resins, made and sold by American Cyanamid Company.

In practice, melamine-formaldehyde resins have given excellent results. These are sold under the trade names of Melmac 401 and 415 by American Cyanamid Company and are obtainable in the form of a dry powder. These resins are applied to the wood in the following manner: a saturated aqueous or alcoholic solution of the resin is made and the wooden sheet, veneer, or plate, or piece, which is of any desired thickness, as heretofore stated, is then soaked in the solution until impregnated to the desired extent. This ordinarily takes but a few minutes at ordinary temperatures. The wooden piece is then removed from the solution and dried.

The treated wooden sheet is then pressed under suitable conditions of heat and pressure in the following manner. It is placed between suitable dies, one of which has the counterpart of the desired pattern formed in its surface. The sheet is then compressed under great pressure forming, for example, a checkered surface 12. The amount of pressure applied on the sheet will depend upon the nature of the wood; but, in practice, good results have been obtained by compressing the wood down to about half its original thickness. The pressure of the dies is maintained on the wood until the desired polymerization of the resin with the components of the wood are obtained. For certain purposes, it may be desired to completely polymerize the resin while, in other cases, it may not be desirable to completely polymerize the resin.

Generally speaking, however, the resin in the wood as treated may be polymerized when the wood has been formed into its desired shape and/or applied to the gun, to furniture or decorative woodwork. In some cases, especially where the final curvature of the wooden plate is compound, it may be desirable only to partially cure the resin in the wood so that it can be bent or warped to final shape when applied to the gun 13, whereupon final curing can be effected.

The checkered plate 12 which is of any suitable shape may be applied to the hand grip portions 14 and 15 of the gun 13 in a manner which has been termed "straight inlaying," or in a manner which has been termed "compression inlaying." The method of applying these plates is shown in Figs. 5 and 6, respectively.

With straight inlaying, as shown in Fig. 5, the base wood 16 forming the stock 17 or the fore portion 18 is initially cut by incisions normal to the surface to form the desired outline. The wood between these boundary incisions is then removed to form a shallow recess 19. The cured checkered plate 12, which may be shaped to a corresponding outline during the molding operation, is then inlaid in said recess 19 and suitably bonded or laminated thereto by pressure and/or heat, using a separate bonding agent such as melamine formaldehyde resin herein described.

To apply the molded plate or sheet 12 by compression inlaying, as shown in Fig. 6, an outline of the shape is first cut by vertical incisions 20 onto the wooden base in the same way as in straight inlaying above described except that the contained wood will not be removed. The molded plate, which is either partially or totally cured, is then placed in register with the cut outline. A suitable die then presses the molded plate into the outlying part of the base wood with such pressure that the fiber of the base wood will be compressed under the molded plate. If desired, the base wood may be previously heated to the proper temperature and, in any event, heat will be applied to the molded plate. In the event that the molded plate is only partially cured, the heat will shape the plate to the shape of the base wood and also complete the curing. In this way, the molded sheet can be bent to conform with the curved hand grip portions of gun 13.

The method of applying checkering to hand gripping parts of a gun above described has many very definite advantages. It permits the use of wood which may be of the same kind as the base wood to which it is attached. In any event, a variety of species of wood is possible, both in kind and in color, regardless of the kind and color of the base wood. The checkered portions, even though impregnated with suitable resin, will have the feel and appearance of wood.

The use of a water or alcohol soluble resin or material, such as that described herein, simplifies the formation of the impregnated compound and the use of a setting resin prevents any loosening or failing of the plate, even though subjected to moisture during actual use of the gun.

It will be further noted that the use of end grain veneer permits the extension of the grain all the way to the apices of the diamonds of the checkering. This provides stronger diamonds and gives the same feel to the user's hands as old fashioned or conventional checkering directly applied to the base wood.

It will be understood that designs other than checkering may be applied to the wood. In fact, any design which is subject to general embossing operations may be impressed into the wooden sheets to suit the taste of the individual firearm user. Pictures, such as of a dog, bird, or other type of animal, may be used. In any event, the embossing operations produce a design having hills and valleys.

It will be understood, furthermore, that in accordance with my invention the proportion of resin to wood may vary somewhat. The upper limit of the proportion of resin would be that which gives an undesirable appearance and feel. The lower limit of resin would be that which would not impart sufficient strength to the diamond apices. Any amount of resin between these two limits may be used.

The amount of resin impregnated into the wood may vary either by changing the amount of resin dissolved in the solution, by the amount of dry powder used in direct compression and/or treatment, or by the amount of time the wood is soaked in the resin or suspension solution, or a combination of both. Such soaking time may be varied from several minutes to several hours. Where the powder is used, the treatment will vary with the amount of heat and/or pressure applied thereto on the wood surface.

The pressures and temperatures used in my invention may vary depending upon the conditions, including the type of wood and type of resin. With the materials given above, pressures as high as 300 to 400 pounds per square inch have been used in molding the checkering into the wooden sheet. The pressure should be sufficient to impress the wood all the way to clearly form the apices of the diamonds or the design in the die. The moisture in the wood helps the impression and shaping of the wood. Likewise, the curing temperature will depend upon the wood and upon the resin in the illustration given above. It has been found that 350° F. has proven successful.

In those cases where a cold setting material, such as the Uracs is used, the method of treating the wood is similar to that indicated with respect to melamine resins, except that little or no heat is required.

Furthermore, in the method according to my invention, the wood, because of its natural water content, may be softened by heating, whereupon the moisture or water enters into a vapor phase to soften and separate the wood fibers preparatory to treatment with the setting material. Also, activating or catalytic agents may be used to accelerate the reaction rate of the setting of the material or resin in and with the treated wood.

The invention can be also applied directly to wood of any desirable size and shape in a manner similar to wooden plate or veneer. For example, as applied to a firearm, the end grain of the butt stock portion can be subjected to the treatment hereinabove described instead of inlaying a checkered sheet or plate.

It will be understood from the foregoing description that the invention therefore may be applied to any wood part of a gun, i. e., the sides or ends of the gun stock, the extension slide handle, and the forearm.

The invention, while described above in relation to the wooden parts of guns and firearms, is applicable generally to the treatment of different kinds of end grain veneer wood of different colors such as, cherry, walnut, birch, oak, etc., wherein a desired different color effect is obtained. By the treatment of such types of wood and their artistic arrangement, color designs of different kinds are produced. In addition, the wood veneer may be treated with resins of different color or where the resins are clear they may be mixed with suitable stable dyes for different color arrangement and effect. The use of such wood treated according to my invention is indicated in furniture, picture frames, panels, veneer designs or effects as pictures of scenes, animals, etc.

The invention as above described relates to checkering or embossing, which includes intaglio, i. e., bas and high relief of end grain wood or veneer. In other words, these terms, "checkering" or "embossing" are intended herein to include the working or treatment of wood wherein the original worked surface thereof is changed to impart a desired design or effect including "feel," or pictorial representation.

The term, "end grain", as used herein means that the grain of the wood is perpendicular to the plane of the wood subjected to treatment herein described.

As to the use of resins or materials, my invention encompasses the use of natural or synthetic resins which are thermosetting, thermoplastic or cold setting, and which are formed by condensation and/or polymerization.

While a preferred embodiment of my invention has been illustrated and described, it is understood that modifications as to form, use, and arrangement of materials, and procedure may be made without departing from the spirit and scope of my invention.

What is claimed is:

1. A wooden hand grip for a firearm comprising a natural wood sheet of end grain wood in which the grain runs generally in the direction of the thickness of the sheet, said sheet being impregnated with a set solid resin, the sheet being inlaid into a supporting surface so that the exposed surface of the sheet is generally co-extensive with said supporting surface adjoining the sheet, the exposed end grain surface of said sheet having an embossed design thereon comprising hills and valleys, said hills being formed of compressed impregnated fibers, the height of the hills being generally longitudinal of the grain of the wood.

2. A wooden hand grip for a firearm according to claim 1 in which the design constitutes checker work, the hills thereof forming unbreakable points, whereby the checker work has the comparable stability of plastic with the natural appearance and feeling of wood.

3. A wooden hand grip for a firearm according to claim 1 in which the resin is a urea-formaldehyde resin, and the impregnated sheet is compression-molded to place the hills and valleys therein.

4. A wooden hand grip for a firearm according to claim 1 in which the resin is a melamine urea-formaldehyde resin, and the impregnated sheet is compression-molded to place the hills and valleys therein.

5. A wooden hand grip for a firearm according to claim 1 in which the resin is a melamine-formaldehyde resin, and the impregnated sheet is compression-molded to place the hills and valleys therein.

References Cited in the file of this patent

UNITED STATES PATENTS

| | | | |
|---|---|---|---|
| 412,299 | Sears | Oct. 8, | 1889 |
| 1,262,826 | Mitchell | Apr. 16, | 1918 |
| 1,843,904 | Smith | Feb. 2, | 1932 |
| 2,008,278 | Goss | July 16, | 1935 |
| 2,245,170 | Von Ende | June 10, | 1941 |
| 2,331,372 | Buchanan | Oct. 12, | 1943 |
| 2,416,554 | Voight | Feb. 25, | 1947 |
| 2,442,422 | Loetscher | June 1, | 1948 |
| 2,486,235 | Watt | Oct. 25, | 1949 |
| 2,541,868 | Gordon | Feb. 13, | 1951 |